(12) United States Patent
Kondoh

(10) Patent No.: US 8,975,556 B2
(45) Date of Patent: Mar. 10, 2015

(54) MANUFACTURING APPARATUS OF COORDINATE DETECTING DEVICE

(75) Inventor: Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1265 days.

(21) Appl. No.: 12/463,458

(22) Filed: May 11, 2009

(65) Prior Publication Data

US 2009/0283507 A1  Nov. 19, 2009

(30) Foreign Application Priority Data

May 15, 2008  (JP) ................................ 2008-128140

(51) Int. Cl.
*B23K 26/073* (2006.01)
*G06F 3/045* (2006.01)
*H01C 17/242* (2006.01)

(52) U.S. Cl.
CPC .............. *G06F 3/045* (2013.01); *H01C 17/242* (2013.01)
USPC .................................................. 219/121.68

(58) Field of Classification Search
USPC ............. 219/121.68, 121.73, 121.82, 121.83; 345/173, 174, 177; 341/33; 707/535; 178/18.05, 18.04, 18.06
See application file for complete search history.

(56) References Cited

U.S. PATENT DOCUMENTS

| | | | | |
|---|---|---|---|---|
| 4,146,673 A | * | 3/1979 | Headley | .......................... 428/335 |
| 5,896,030 A | * | 4/1999 | Hasken | .......................... 324/235 |
| 6,163,313 A | * | 12/2000 | Aroyan et al. | ................. 345/173 |
| 6,875,950 B2 | * | 4/2005 | Naumov et al. | ........... 219/121.69 |
| 2002/0100749 A1 | * | 8/2002 | Swenson et al. | .......... 219/121.69 |
| 2002/0179592 A1 | * | 12/2002 | Hiramatsu et al. | ........... 219/444.1 |
| 2006/0065646 A1 | * | 3/2006 | Pailthorp et al. | .......... 219/121.69 |
| 2007/0012665 A1 | * | 1/2007 | Nelson et al. | ............. 219/121.69 |
| 2007/0013678 A1 | | 1/2007 | Nakajima et al. | |

FOREIGN PATENT DOCUMENTS

| | | |
|---|---|---|
| JP | 10-83251 A | 3/1998 |
| JP | 2001-125724 A | 5/2001 |
| JP | 2007-25904 A | 2/2007 |
| KR | 10-2005-0059977 | 6/2005 |
| KR | 10-0573931 | 4/2006 |

OTHER PUBLICATIONS

Office Action dated Jan. 7, 2011 issued with respect to the corresponding Korean Patent Application No. 10-2009-0038936.

* cited by examiner

*Primary Examiner* — Thien S Tran
(74) *Attorney, Agent, or Firm* — IPUSA, PLLC

(57) ABSTRACT

A coordinate detecting device includes a resistive film formed on a substrate and a common electrode for applying a voltage to the resistive film, wherein a potential distribution is created in the resistive film, an electric potential of the resistive film at a contact position is detected, and a position of the contact position of the resistive film is detected. In a manufacturing apparatus, a laser light source irradiates laser light to remove a part of the resistive film to form a resistive film removed part, an optical system converges the laser light, a plurality of probes measure electric potentials of a surface of the resistive film with the common electrode providing the voltage to the resistive film, an X-Y table moves the substrate at least two-dimensionally, and a control part controls the X-Y table and the laser light source.

9 Claims, 11 Drawing Sheets

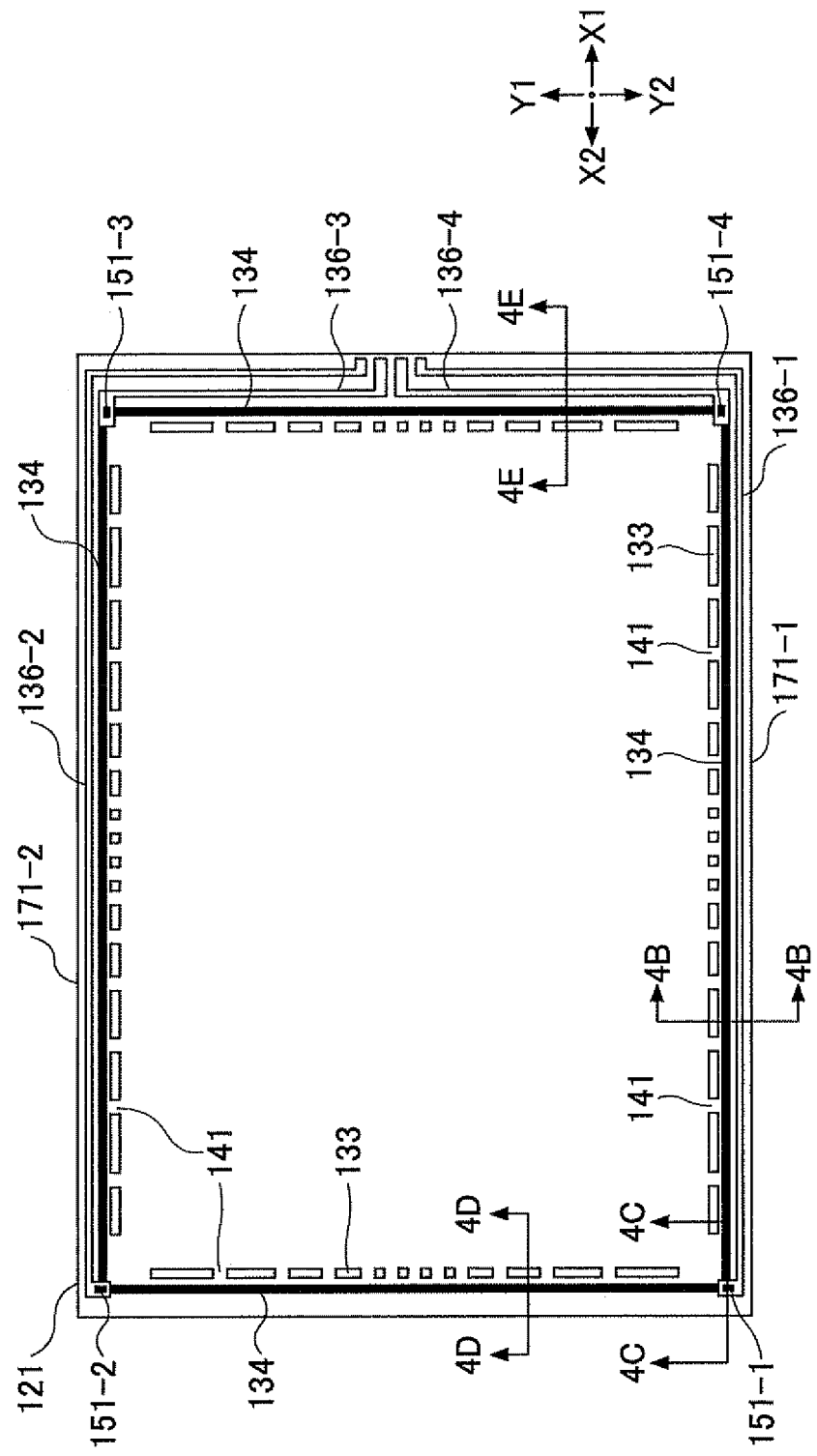

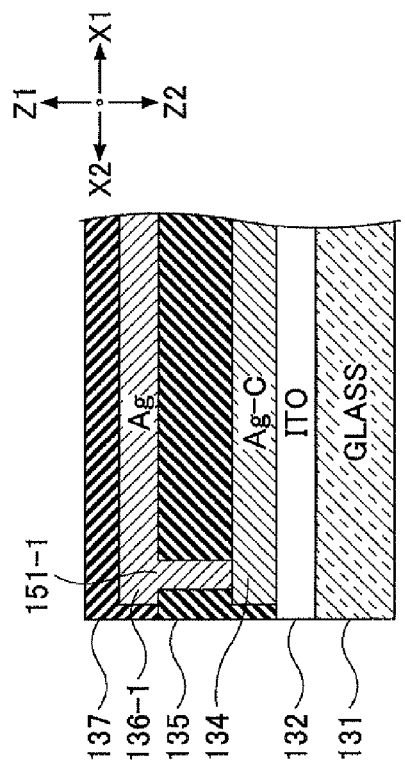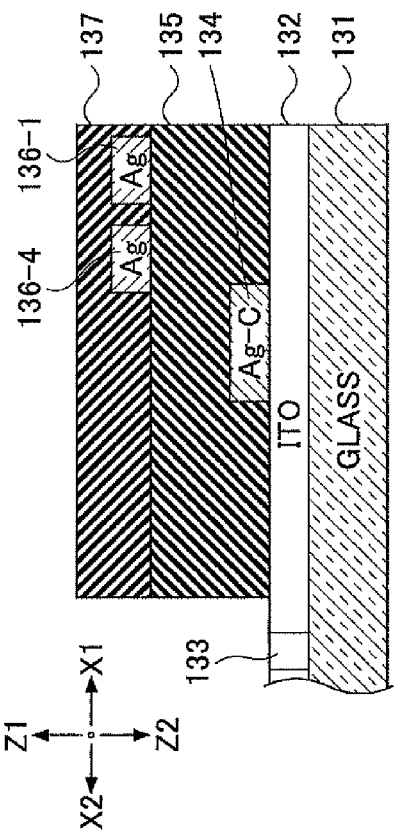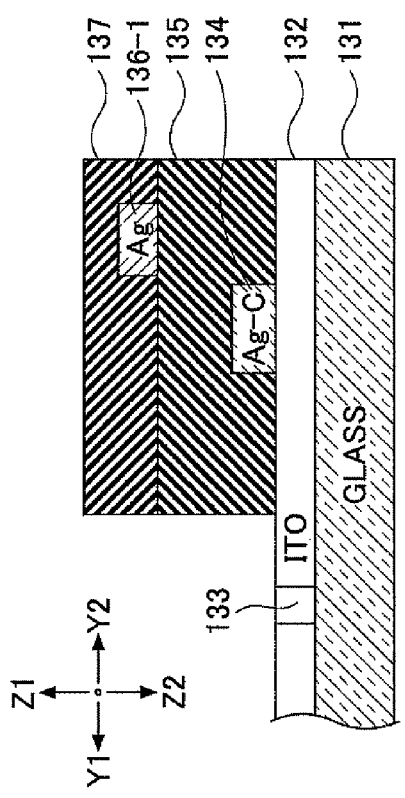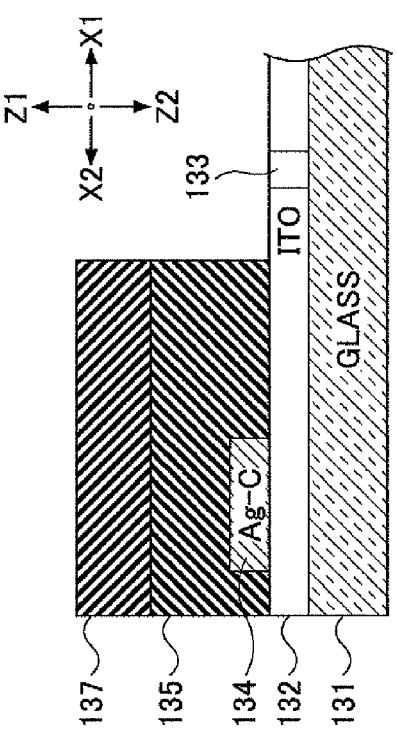

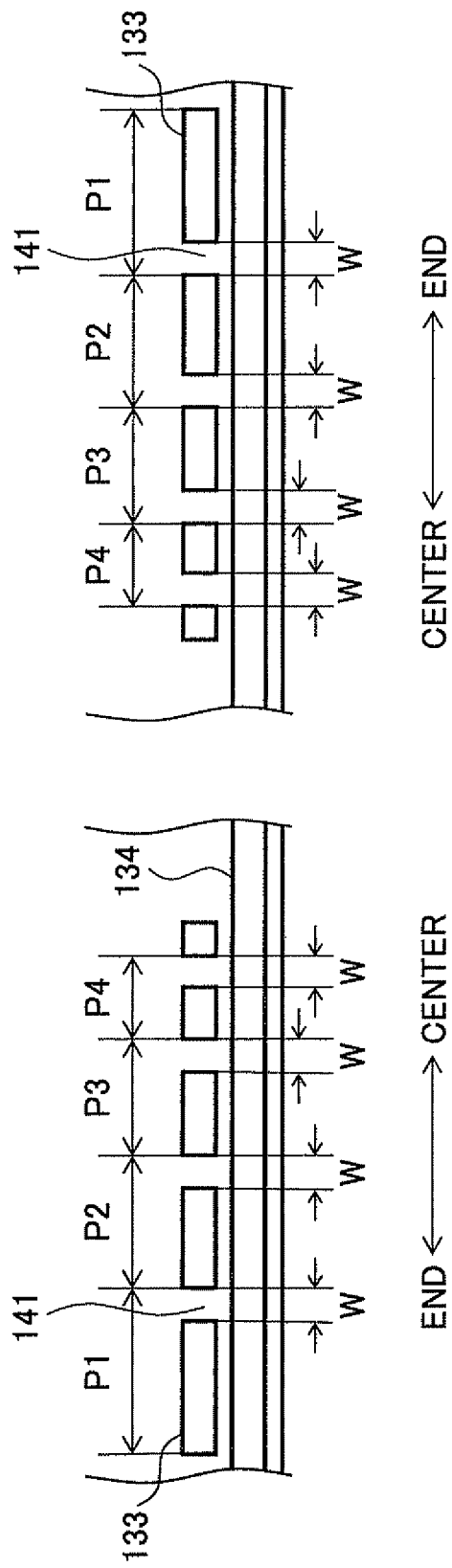

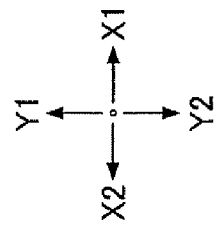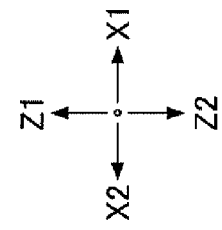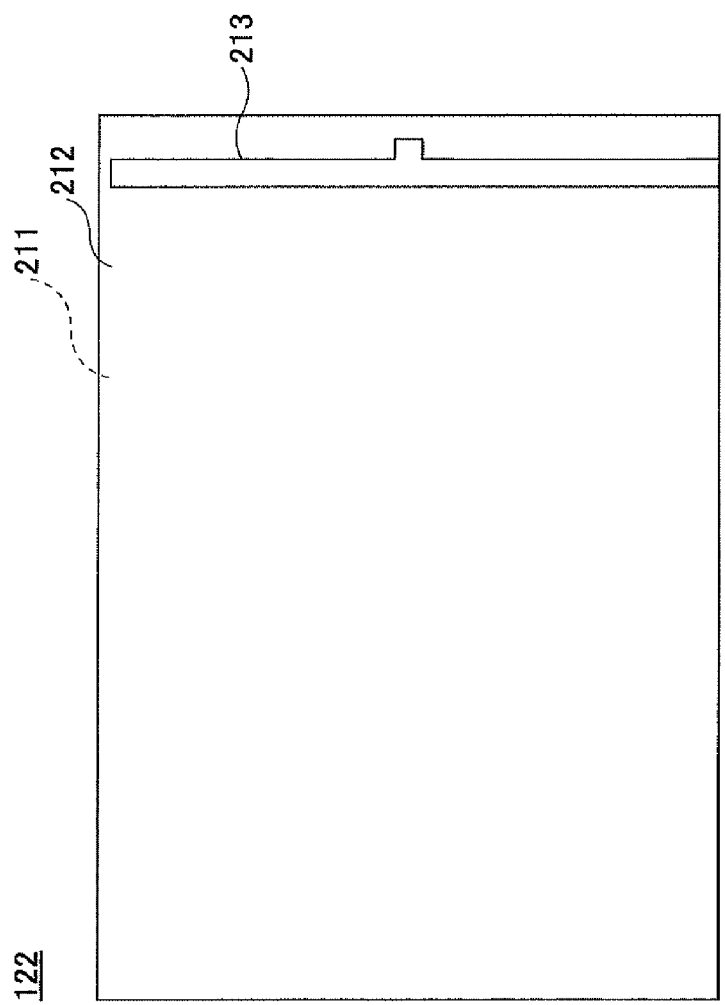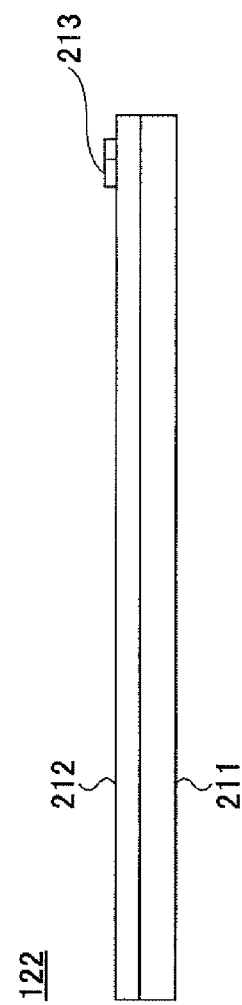
FIG.6A  FIG.6B

MANUFACTURING APPARATUS OF COORDINATE DETECTING DEVICE

CROSS-REFERENCE TO RELATED APPLICATIONS

This application is based upon and claims the benefit of priority of the prior Japanese Patent Application No. 2008-128140, filed on May 15, 2008, the entire contents of which are incorporated herein by reference.

BACKGROUND OF THE INVENTION

1. Field of the Invention

The present invention relates to a manufacturing apparatus for manufacturing a coordinate detecting device.

2. Description of the Related Art

For example, as an input device for a computer system, a touch panel is known. A touch panel may be mounted on a display device, and, may be such that, a coordinate position on the display device is detected, and a detection signal according to the coordinate position may be obtained. Thus, the touch panel makes it possible to input the detection signal according to the coordinate position to the computer system directly, and thus, the touch panel makes it possible to carry out easy and intuitive input.

For a touch panel, various types such as a resistive film type, an optical type, a capacity coupling type, and so forth, are proposed. Among such touch panels, a touch panel of the resistive film type is common, which has a simple configuration and requires a simple control system. The resistive film type touch panel may be of a four-wire type, a five-wire type, an eight-wire type or of many different types to dispose electrodes on a resistive film.

Among these types, the five-wire type touch panel does not have a problem concerning edge sliding which may be a problem of the four-wire type touch panel and an eight-wire type touch panel. This is because, in the five-wire type touch panel, an electrically conductive film of an upper substrate disposed on an operating surface side is used only for reading an electric potential. Therefore, the five-wire type touch panel is used in a market which requires a tough operation environment or durability for a long term.

FIG. 9 depicts an example of a configuration of a five-wire type resistive film type touch panel. The five-wire type resistive film type touch panel 1 depicted in FIG. 9 includes an upper substrate 11 and a lower substrate 12. In the lower substrate 12, a transparent resistive film 22 is formed on the whole area of a glass substrate 21, and X-axis coordinate detecting electrodes 23, 24 and Y-axis coordinate detecting electrodes 25, 26 are formed on the transparent resistive film 22. In the upper substrate 11, a transparent resistive film 32 is formed on a film substrate 31, and a coordinate detecting electrode 33 is formed on the transparent resistive film 32.

In the five-wire type resistive film type touch panel 1, first, a voltage is applied between the X-axis coordinate detecting electrodes 23 and 24. As a result, an electric potential distribution occurs along an X-axis direction X1-X2 of the transparent resistive film 22 of the lower substrate 12. Then, by detecting an electric potential of the transparent resistive film 22 of the lower substrate 12 at a position at which the upper substrate 11 comes into contact with the lower substrate 12, it is possible to detect an X coordinate of the position at which the upper substrate 11 comes into contact with the lower substrate 12. Next, a voltage is applied between the Y-axis coordinate detecting electrodes 25 and 26. As a result, an electric potential distribution occurs along a Y-axis direction Y1-Y2 of the transparent resistive film 22 of the lower substrate 12. Then, by detecting an electric potential of the transparent resistive film 22 of the lower substrate 12 at a position at which the upper substrate 11 comes into contact with the lower substrate 12, it is possible to detect a Y coordinate of the position at which the upper substrate 11 comes into contact with the lower substrate 12.

At this time, in such a type of a touch panel, how the electric potential distribution can be created uniformly along each of the X-axis direction X1-X2 and the Y-axis direction Y1-Y2 of the transparent resistive film 22 of the lower substrate 12 may be a problem. As a method to solve the problem, Japanese Laid-Open Patent Application No. 10-83251 (referred to as a patent document 1) discloses a method of providing a plurality of stages of electric potential distribution correcting patterns in the periphery of a resistive film.

Japanese Laid-Open Patent Application No. 2001-125724 (referred to as a patent document 2) discloses a method of providing a common electrode which surrounds the periphery of an input surface. Japanese Laid-Open Patent Application No. 2007-25904 (referred to as a patent document 3) discloses a method of forming opening parts in an insulative film provided on a transparent resistive film, and providing an electric potential from the opening parts.

It is noted that, reducing a size of such a coordinate detecting device may be required because size reduction of an apparatus in which the coordinate detecting device is mounted is required. According to a coordinate detecting device disclosed in the patent document 1, it may be difficult to reduce a size of the coordinate detecting device since the plurality of stages of electric distribution correcting patterns are provided in the periphery of the resistive film as mentioned above.

In the method disclosed by the patent document 2 to provide a common electrode which surrounds the periphery of an input surface as mentioned above, an electric potential distribution of a transparent resistive film may be distorted unless a resistance ratio of the transparent resistive film and a pattern resistance is increased.

In the method disclosed by the patent document 3 to form opening parts in an insulative film provided on a transparent resistive film, although the above-mentioned two problems may be solved, a complicated manufacturing process may be required. Especially, a yield of product performance may degrade because of a possible variation of a material or a resistance value which may occur during manufacturing.

SUMMARY OF THE INVENTION

The present invention has been devised in consideration of the above-mentioned points, and an object of the present invention is to provide a manufacturing apparatus such that it is possible to manufacture a coordinate detecting device having a reduced size and having improved coordinate position detecting capability with high productivity.

According to the present invention, a manufacturing apparatus of a coordinate detecting device for manufacturing a coordinate detecting device is provided. The coordinate detecting device has a resistive film formed on a substrate and a common electrode which applies a voltage to the resistive film. In the coordinate detecting device, an electric potential distribution is created in the resistive film, an electric potential of the resistive film at a position at which a probe comes into contact is detected, and a coordinate of the position of the resistive film is detected. The manufacturing apparatus includes a laser light source which irradiates laser light to remove a part of the resistive film and form a resistive film removed part, an optical system which converges the laser light, a plurality of probes which measure electric potentials of a surface of the resistive film in a state in which a voltage is applied to the resistive film via the common electrode, an X-Y table which moves the substrate at least two-dimensionally, and a control part which controls the X-Y table and the laser light source.

Additional objects and advantages of the embodiment are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory only and are not restrictive of the inventions as claimed.

BRIEF DESCRIPTION OF DRAWINGS

FIGS. 4A, 4B, 4C, 4D and 4E depict a configuration of a panel part of the coordinate detecting device depicted in FIG. 1;

FIG. 5 depicts a partial plan view of a resistive film removed parts of the coordinate detecting device depicted in FIGS. 4A, 4B, 4C, 4D and 4E;

FIGS. 6A and 6B depict a configuration of an upper substrate of the coordinate detecting device depicted in FIG. 1;

DETAILED DESCRIPTION OF THE PREFERRED EMBODIMENT

According to a preferred embodiment, a manufacturing apparatus for manufacturing a coordinate detecting device is provided. The coordinate detecting device includes a resistive film formed on a substrate and a common electrode which applies a voltage to the resistive film. In the coordinate detecting device, an electric potential distribution is created on the resistive film, an electric potential of the resistive film at a position at which a probe comes into contact is detected, and a coordinate of the position on the resistive film is detected. The manufacturing apparatus includes a laser light source which irradiates laser light to remove a part of the resistive film and form a resistive film removed part, an optical system which converges the laser light, a plurality of probes which measure electric potentials on a surface of the resistive film in a state in which the common electrode provides a voltage to the resistive film, an X-Y table which moves the substrate at least two-dimensionally, and a control part which carries out control of the X-Y table and the laser light source.

In the manufacturing apparatus in the preferred embodiment, the substrate of the coordinate detecting device may be made of an insulative material which transmits the laser light, and the laser light may be irradiated by the laser light source from a surface of the substrate of the coordinate detecting device, opposite to a surface of the substrate of the coordinate detecting device on which the resistive film is formed.

Further, in the manufacturing apparatus in the preferred embodiment, the plurality of probes may be provided on a side of the substrate of the coordinate detecting device opposite to a side of the substrate of the coordinate detecting device on which the laser light source is provided.

Further, in the manufacturing apparatus in the preferred embodiment, the resistive film of the coordinate detecting device may be made of a material including ITO (Indium Tin Oxide), or indium oxide, tin oxide or zinc oxide.

Further, in the manufacturing apparatus in the preferred embodiment, the substrate and the resistive film of the coordinate detecting device may be transparent in a visible region.

Further, in the manufacturing apparatus in the preferred embodiment, a wavelength of the laser light may fall within a range between 340 and 420 [nm].

Further, in the manufacturing apparatus in the preferred embodiment, the laser light source may be an excimer laser.

In the preferred embodiment, it is possible to provide the manufacturing apparatus by which it is possible to manufacture a coordinate detecting device having a reduced size and having improved coordinate position detecting capability with high productivity.

Figure 1:
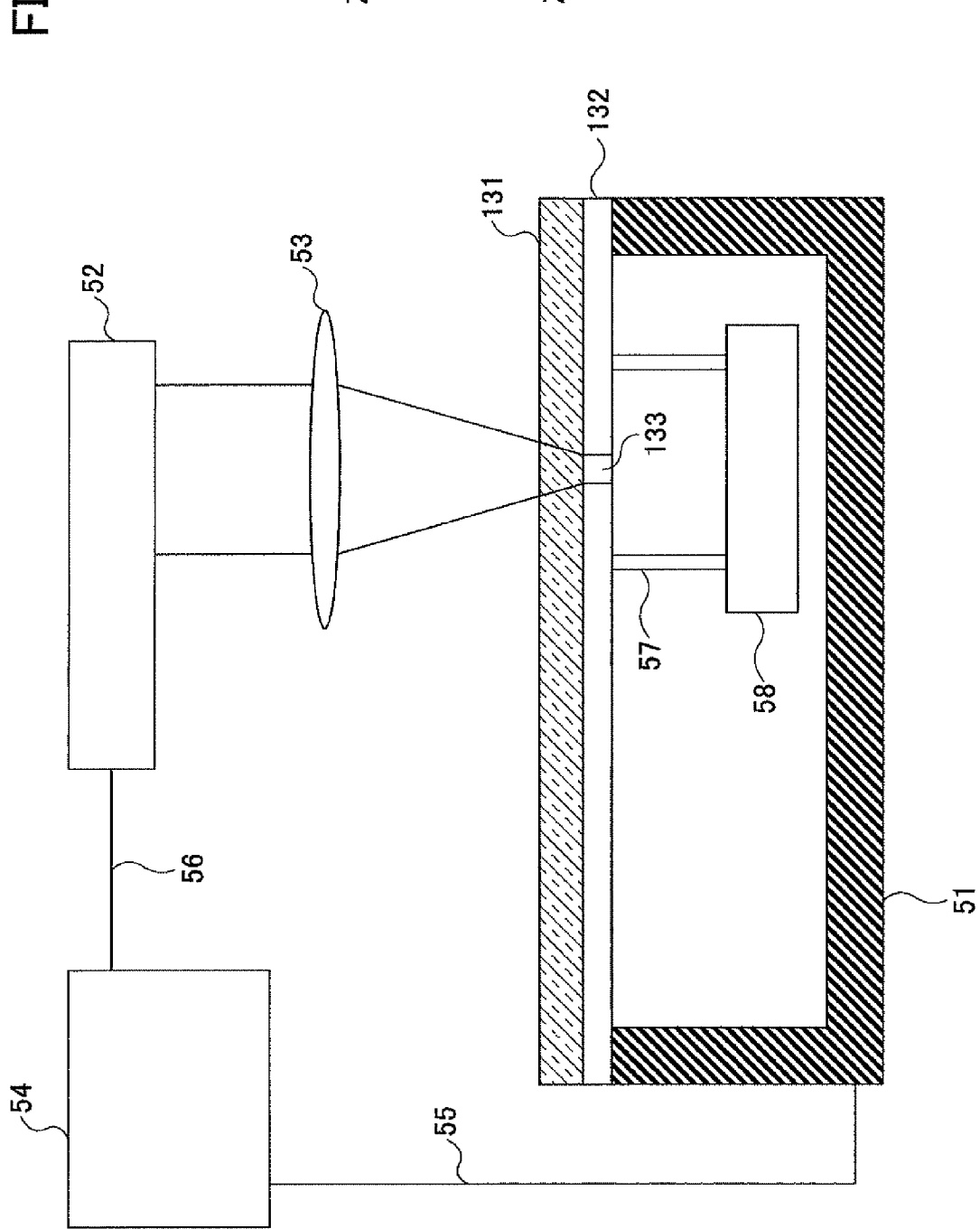
FIG. 1 depicts a configuration of a manufacturing apparatus in an embodiment.

The manufacturing apparatus in the preferred embodiment will now be described more specifically with reference to FIG. 1.

[Manufacturing Apparatus]

The manufacturing apparatus in the preferred embodiment includes an X-Y table 51 which has a function of moving a glass substrate 131 of a coordinate detecting device two-dimensionally, a laser light source 52, an optical system used to converge laser light emitted by the laser light source 51 to a transparent resistive film 132 of the coordinate detecting device made of ITO or such formed on the glass substrate 131 of the coordinate detecting device, and a control circuit 54 which controls movement of the X-Y table 51 and timing of oscillation of the laser light source 52. The control circuit 54 and the X-Y table 51 are connected together by a cable 55 for communication of a control signal, power supply and so forth, and the control circuit 54 and the laser light source 52 are connected together by a cable 56 for communication of a control signal, power supply and so forth. Further, probes 57 and an electric potential measuring unit 58 for measuring electric potentials on the transparent resistive film 132 are provided. The probes 57 are made to come into contact with a surface of the transparent resistive film 132 in a state in which a voltage is applied to the transparent resistive film 132 via a common electrode 134 of the coordinate detecting device, not depicted, which will be described later, and electric potentials on the transparent resistive film 132 are measured with the use of the probes 57.

As will be described later, corresponding portions of the transparent resistive film 132 of the coordinate detecting device are removed to form resistive film removed parts 133 based on information of the electric potentials on the transparent resistive film 132 thus measured with the use of the probes 57. For the purpose of applying a voltage to the transparent resistive film 132 via the common electrode 134 for measuring the electric potentials on the transparent resistive film 132 as mentioned above, the probes 57 include probes for applying a voltage to the common electrode 134. A specific method of removing of the corresponding portions of the transparent resistive film 132 to form the resistive film removed parts 133 based on information of the measured electric potentials will be described later when a manufacturing method is described.

It is noted that the glass substrate 131 of the coordinate detecting device on which the transparent resistive film 132 is formed is set to the X-Y table 51 in such a manner that the laser light source 52 is located on a side of the glass substrate 131 opposite to a side on which the transparent resistive film 132 is formed. Further, the probes 57 and the electric potential measuring unit 58 are set on a side of the glass substrate 131 on which the transparent resistive film 132 is formed, opposite to a side of the glass substrate 131 on which the laser light source 52 is provided. It is noted that the glass substrate 131 and the transparent resistive film 132 depicted in FIG. 1 are depicted with an exaggerated thickness for explanatory purposes.

As mentioned above, the probes 57 and the electric potential measuring unit 58 are provided on the side of the glass substrate 131 opposite to the side on which the laser light source 52 is provided. Thereby, it is possible to irradiate laser light by means of the laser light source 52 without regard to the existence of the probes 57 and the electric potential measuring unit 58. Thus, a freedom for an arrangement in the manufacturing apparatus improves, and also, it is possible to carry out work in the manufacturing apparatus with less restriction. Thus, it is possible to improve working efficiency.

In the manufacturing apparatus configured as described above with reference to FIG. 1, the glass substrate 131 of the coordinate detecting device on which the transparent resistive film 132 is formed is placed on the X-Y table 51. In this state, with the X-Y table 51 moving the glass substrate 131 two-dimensionally, the laser light source 52 irradiates a predetermined area of the transparent resistive film 132 with laser light to form the resistive film removed part 133. The laser light source 52 is an excimer laser in the embodiment, and a wavelength of laser light emitted by the laser light source 52 is approximately 355 [nm]. The glass substrate 131 transmits laser light of the wavelength, but the transparent resistive film 132 has low transmittance with respect to laser light of the wavelength. Therefore, in the predetermined area to which laser light of the wavelength is thus irradiated, the glass substrate 131 transmits the laser light, and the transparent resistive film 132 thus having the low transmittance absorbs the laser light. Therefore, as a result of the laser light being thus irradiated, the transparent resistive film 132 is removed by ablation from the surface of the glass substrate 131 in the predetermined area to which the laser light has been thus irradiated. Thus, each resistive film removed part 133 is formed as a hole bored in the transparent resistive film 132.

Figure 2:
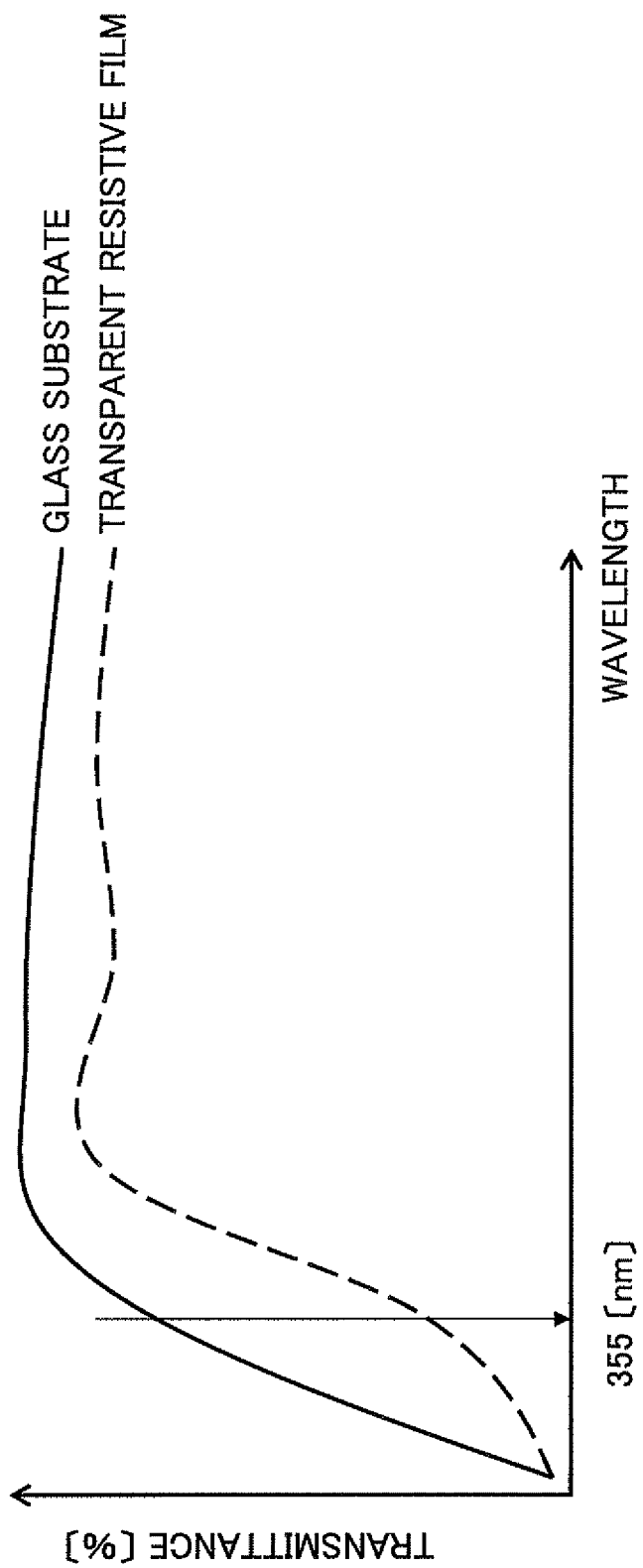
FIG. 2 depicts a relationship between wavelength and transmittance of a glass substrate and a transparent resistive film.

Specifically, as depicted in FIG. 2, transmittance of the glass substrate 131 and transmittance of the transparent resistive film 132 are different with respect to a light wavelength. Especially, around 355 [nm] in wavelength, such a wavelength region exists that a difference between transmittance of the glass substrate 131 and transmittance of the transparent resistive film 132 is large, where the glass substrate 131 transmits laser light but the transparent resistive film 132 has low transmittance with respect to the laser light. Although specific values are slightly different among specific materials of the transparent resistive film 132, a wavelength falling within a range between 340 and 420 [nm] is transmitted by the glass substrate 131, and can be used to remove the transparent resistive film 132 for the resistive film removed part 133. This fact was obtained by the inventor from empirical observation. In the embodiment, under the foundation, laser light of the wavelength of 355 [nm] is used to remove a part of the transparent resistive film 132 for the resistive film removed part 133.

Thus, in the manufacturing apparatus in the embodiment, the predetermined area of the transparent resistive film 132 formed on the glass substrate 131 is removed for the resistive film removed part 133. Each predetermined area in which the transparent resistive film 132 is thus removed has a shape such that, as described later, an electric potential distribution in the transparent resistive film 132 can be made uniform. In the embodiment, as the material of the transparent resistive film 132, ITO is used. Further, instead, such a material, which includes indium oxide, tin oxide or zinc oxide, and is transparent in a visible region, may be used as a material of the transparent resistive film 132. Also in such a case, the same effect as that in the case where ITO is used as the material of the transparent resistive film 132 in the embodiment can be obtained.

[Coordinate Detecting Device and Manufacturing Method of Coordinate Detecting Device]

Next, a coordinate detecting device manufactured by the manufacturing apparatus in the embodiment will be described. Specifically, a lower substrate 121 described later is manufactured by the manufacturing apparatus in the embodiment.

(System Configuration)

Figure 3:
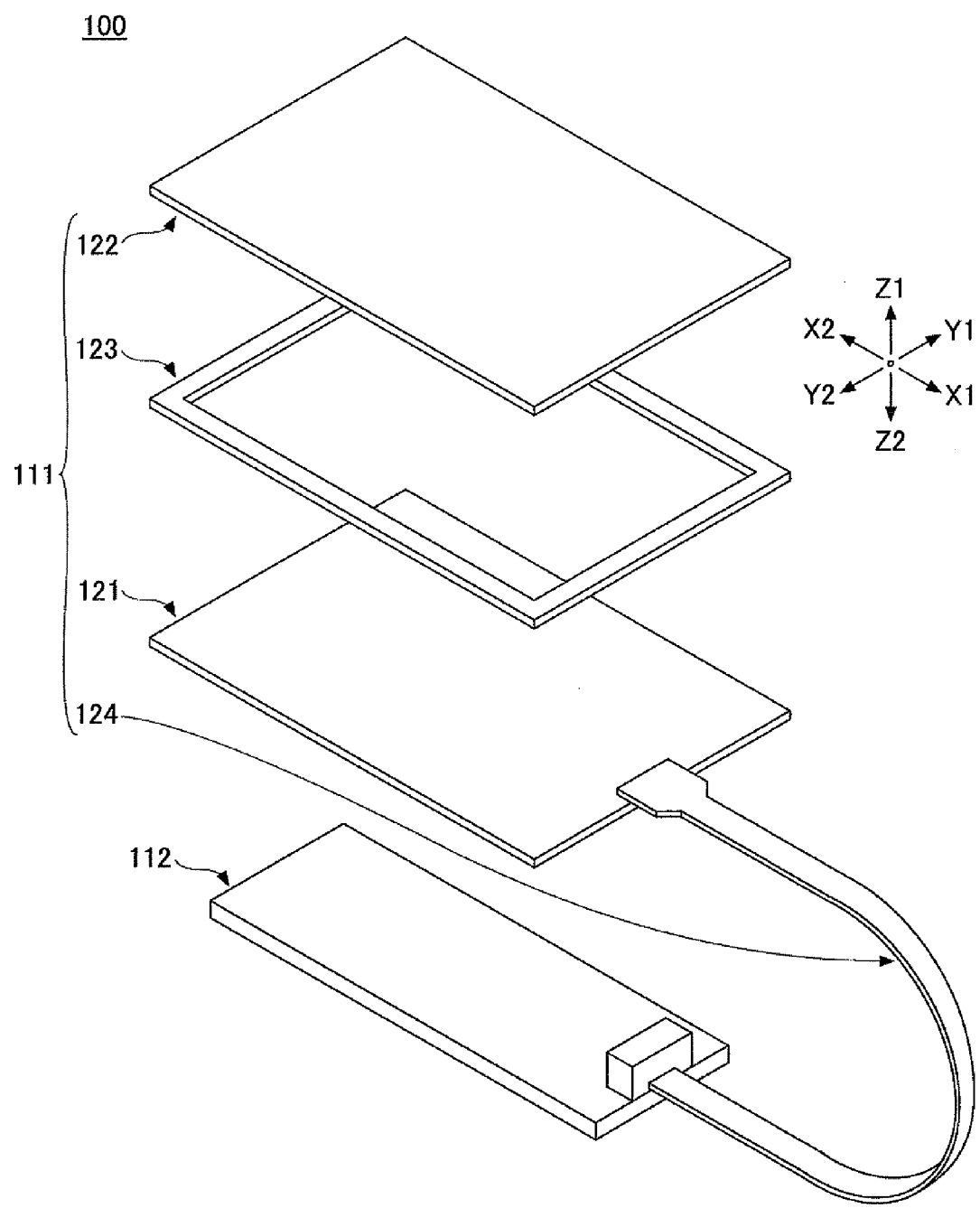
FIG. 3 depicts a configuration of a coordinate detecting device manufactured by the manufacturing apparatus in the embodiment.

FIG. 3 depicts a configuration of a system in the coordinate detecting device in an embodiment. As the coordinate detecting device 100 in the embodiment, a five-wire type resistive film type touch panel will be described. The coordinate detecting device 100 in the embodiment includes a panel part 111 and an interface board 112.

The panel part 111 includes the lower substrate 121, an upper substrate 122, a spacer 123 and a FPC (Flexible Printed Circuit) cable 124. The lower substrate 121 and the upper substrate 122 are bonded together via the spacer 123. The spacer 123 is made of an insulative double-sided adhesive tape, or such. The spacer 123 bonds the lower substrate 121 and the upper substrate 122 together in such a state that a predetermined space is kept between the lower substrate 121 and the upper substrate 122. The FPC cable 124 has such a configuration that, on a flexible printed circuit board, first through fifth wires are formed. The FPC cable 124 is connected to the lower substrate 121 as a result of, for example, thermo-compression bonding being carried out with the use of anisotropic electrically conductive films or such.

(Lower Substrate 121)

Next, a configuration of the lower substrate 121 will be described with reference to FIGS. 4A, 4B, 4C, 4D and 4E. FIG. 4A depicts a plan view of the lower substrate 121. FIG. 4B depicts a sectional view of the lower substrate 121 taken along a line 4B-4B. FIG. 4C depicts a sectional view of the lower substrate 121 taken along a line 4C-4C. FIG. 4D depicts a sectional view of the lower substrate 121 taken along a line 4D-4D. FIG. 4E depicts a sectional view of the lower substrate 121 taken along a line 4E-4E.

The lower substrate 121 includes the glass substrate 131, the transparent resistive film 132, resistive film removed parts 133, a common electrode 134, a first insulative film 135, first through fourth wires 136-1, 136-2, 136-3 and 136-4 and a second insulative film 137. On the glass substrate 131, the transparent resistive film 132 is formed approximately all over the area of the glass substrate 131. The transparent resistive film 132 may be formed as a result of, for example, a film being made of ITO or such being formed by a vacuum deposition method or such, transmits light of a visible region and has a predetermined resistance.

(Resistive Film Removed Parts 133)

The resistive film removed parts 133 are formed at positions of the transparent resistive film 132 in the periphery of the glass substrate 131, to the inside of an area in which the common electrode 134 is formed. As depicted in FIG. 5, a space W between each adjacent ones of the resistive film removed parts 133 is equal to each other. As will be described later, the space W between each adjacent ones of the resistive film removed parts 133 corresponds to an electric potential providing part 141 described later. A pitch between each adjacent ones of the resistive film removed parts 133 is longer around each of both ends of each of a first side 171-1, a second side 171-2, a third side 171-3 and a fourth side 171-4 of a rectangular shape of the panel part 121, and becomes shorter as approaching the center between both ends of each of the first through fourth sides 171-1, 171-2, 171-3 and 171-4, as depicted in FIGS. 4A and 5. Specifically, from each of both ends through the center for each of the first through fourth sides 171-1, 171-2, 171-3 and 171-4, the pitches P1, P2, P3, P4, . . . of the resistive film removed parts 133 are such that P1>P2>P3>P4, . . . , as depicted in FIG. 5.

(Electric Potential Providing Parts 141)

Each of the above-mentioned electric potential providing parts 141 is a part of the transparent resistive film 132 left between each adjacent ones of the resistive film removed parts 133 in which the transparent resistive film 132 is removed as mentioned above. Through the electric potential providing parts 141, electric potentials are provided to the entire area of the transparent resistive film 132 from the common electrode 134. In the embodiment, specifically, with reference to FIGS. 4A, 4B, 4C, 4D, 4E and 5, a pitch between each adjacent ones of the electric potential providing parts 141 is longer around each of both ends of each of the first through fourth sides 171-1, 171-2, 171-3 and 171-4 of the panel part 121, and becomes shorter as approaching the center between both ends of each of the first through fourth sides 171-1, 171-2, 171-3 and 171-4. By thus configuring the electric potential providing parts 141, it is possible to reduce distortion of an electric potential distribution, if any, around the first through fourth sides 171-1, 171-2, 171-3 and 171-4 in which the electric potential distribution is likely to be distorted remarkably. Thus, it is possible to make uniform the electric potential distribution created on the transparent resistive film 132 by configuring the electric potential providing parts 141 as mentioned above. Thereby, it is possible to detect a coordinate position in the coordinate detecting device 100 precisely.

It is noted that, specific shapes of the resistive film removed parts 133 are not limited to those depicted in FIGS. 4A, 4B, 4C, 4D, 4E and 5. The resistive film removed parts 133 may have any shape as long as, consequently, the electric potential distribution created on the transparent resistive film 132 is made uniform by the function of the resistive film removed parts 133 or the electric potential providing parts 141.

(Common Electrode 134)

The common electrode 134 is made of Ag—C, for example, and is formed on the transparent resistive film 132 outside of the resistive film removed parts 133.

As depicted in FIG. 4A, the common electrode 134 extends along the four sides 171-1, 171-2, 171-3 and 171-4 of the rectangular shape of the lower substrate 121.

(First Insulative Film 135)

The first insulative film 135 is formed in such a manner that the first insulative film 135 is provided above the resistive film removed parts 133 and covers the common electrode 134. The first insulative film 135 has first through fourth through holes 151-1, 151-2, 151-3 and 151-4 formed therein in respective four corners of the rectangular shape of the lower substrate 121. The first through fourth through holes 151-1, 151-2, 151-3 and 151-4 act as driving voltage applying parts.

(First Through Fourth Wires 136-1 Through 136-4)

The first wire 136-1 is made of a low resistance material such as Ag, for example, and is formed on the first insulative film 135 along with the first side 171-1 of the lower substrate 121. The first wire 136-1 further extends to embed in the first through hole 151-1 formed in the first insulative film 135 to be connected with the common electrode 134 at a first corner at which the first through hole 151-1 is provided, as depicted in FIG. 4C. Further, the first wire 136-1 is connected to the corresponding first wire included in the FPC cable 124 depicted in FIG. 3.

Similarly, a second wire 136-2 is made of a low resistance material such as Ag, for example, and is formed on the first insulative film 135 along with the second side 171-2 opposite to the first side 171-1 of the lower substrate 121. The second wire 136-2 further extends to embed in the second through hole 151-2 formed in the first insulative film 135 to be connected with the common electrode 134 at a second corner at which the second through hole 151-2 is provided. Further, the second wire 136-2 is connected to the corresponding second wire included in the FPC cable 124 depicted in FIG. 3.

A third wire 136-3 is made of a low resistance material such as Ag, for example, and is formed on the first insulative film 135 along with a half of the third side 171-3 on the side of the second side 171-2, the third side 171-3 being perpendicular to the first and second sides 171-1 and 171-2 of the lower substrate 121. The third wire 136-3 further extends to embed in the third through hole 151-3 formed in the first insulative film 135 to be connected with the common electrode 134 at a third corner at which the third through hole 151-3 is provided. Further, the third wire 136-3 is connected to the corresponding third wire included in the FPC cable 124 depicted in FIG. 3.

A fourth wire 136-4 is made of a low resistance material such as Ag, for example, and is formed on the first insulative film 135 along with a half of the third side 171-3 of the lower substrate 121 on the side of the first side 171-1. The fourth wire 136-4 further extends to embed in the fourth through hole 151-4 formed in the first insulative film 135 to be connected with the common electrode 134 at a fourth corner at which the fourth through hole 151-4 is provided. Further, the fourth wire 136-4 is connected to the corresponding fourth wire included in the FPC cable 124 depicted in FIG. 3.

The second insulative film 137 is formed on the first insulative film 135 to cover the first through fourth wires 136-1, 136-2, 136-3 and 136-4. Further, the upper substrate 122 is bounded above the second insulative film 137 via the spacer 123 depicted in FIG. 3.

(Upper Substrate 122)

Next, a configuration of the upper substrate 122 will be described with reference to FIGS. 6A and 6B. FIG. 6A depicts a top view of the upper substrate 122, and FIG. 6B depicts a sectional view of the upper substrate 122. It is noted that the upper substrate 122 depicted in FIG. 6B is depicted with an exaggerated thickness for explanatory purposes. The upper substrate 122 includes a film substrate 211, a transparent resistive film 212 and an electrode 213. The film substrate 211 is made of, for example, a resin film having flexibility of a material such as PET (polyethylene terephthalate).

On a side of the film substrate 211 opposite to the lower substrate 121, the transparent resistive film 212 is formed throughout the whole area of the film substrate 211. The transparent resistive film 212 is made of a transparent electrically conductive material such as ITO, for example.

The electrode 213 is disposed on the transparent resistive film 212 of the upper substrate 122 at an end of an X1 direction as depicted in FIGS. 6A and 6B. The electrode 213 is connected to the fifth wire of the FPC cable 124 via a contact (not depicted). It is noted that the FPC cable 124 is also connected with the lower substrate 121 as depicted in FIG. 3. The upper substrate 122 is used as a probe, and an electric potential on the transparent resistive film 132 provided on the lower substrate 121 at which the upper substrate 122 comes into contact with is detected, by means of the interface board 112. Thus, a coordinate position is detected in the coordinate detecting device 100.

(Detecting Procedure)

Figure 7:
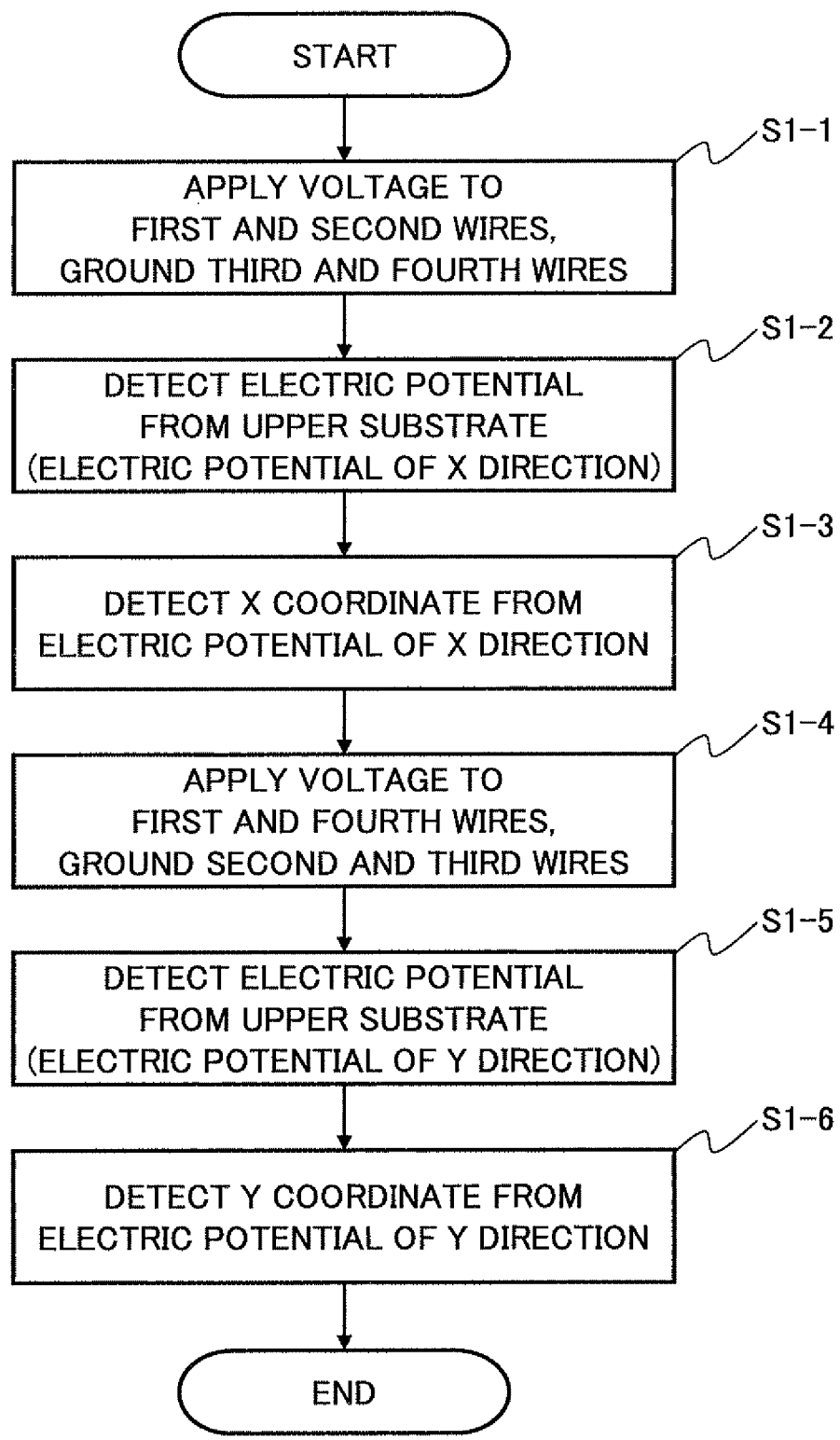
FIG. 7 depicts a flow chart of operation carried out by an interface board of the coordinate detecting device depicted in FIG. 1.
Figure 8A:
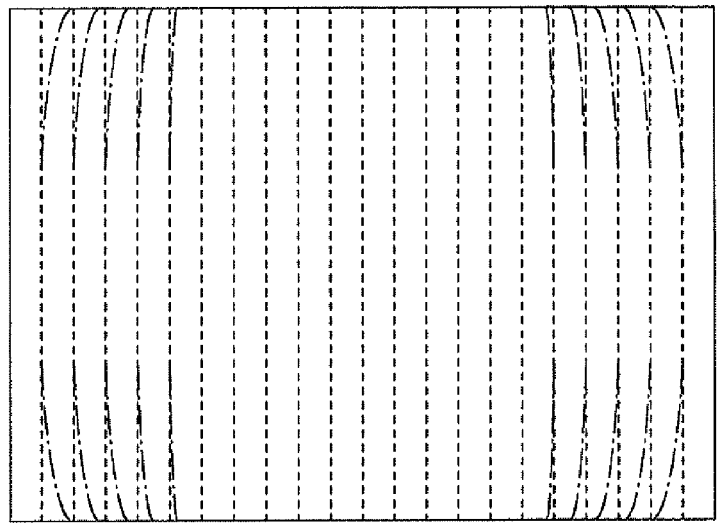
FIGS. 8A and 8B depict states of electric potential distribution in a lower substrate of the coordinate detecting device depicted in FIG. 1.
Figure 8B:
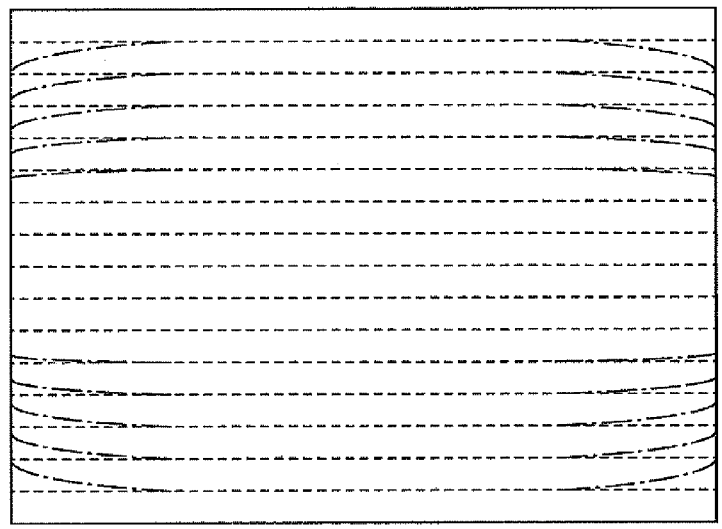
Figure 9:
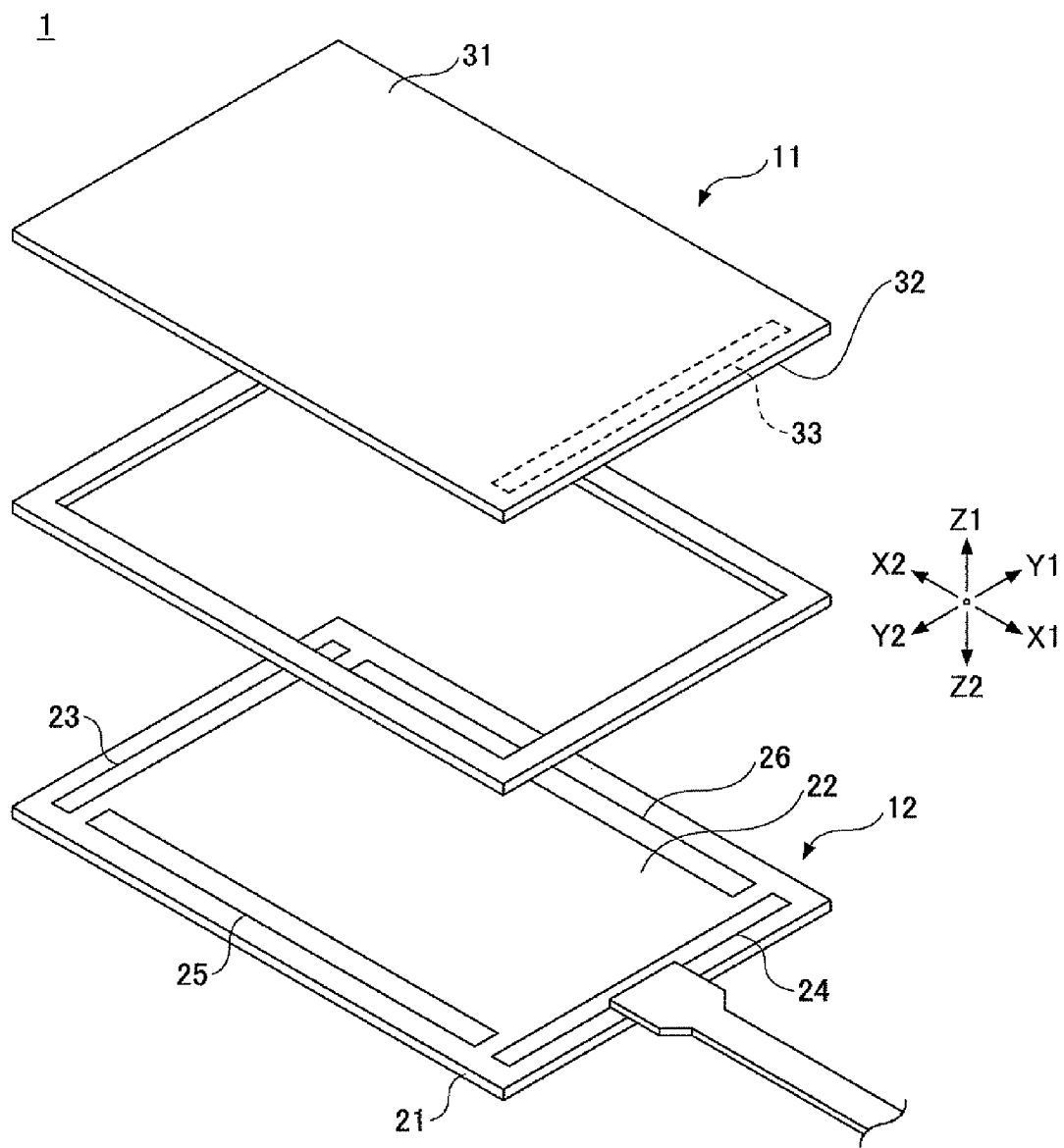
FIG. 9 depicts a configuration of a five-wire-type resistive film-type touch panel in the related art.

Next, a procedure of detecting a coordinate position in the coordinate detecting device 100 in the embodiment will be described. FIG. 7 depicts a flow chart of an operation carried out by the interface board 112. FIGS. 8A and 8B depict electric potential distributions created on the transparent resistive film 132 provided on the lower substrate 121. FIG. 8A depicts an electric potential distribution created along the X direction X1-X2 when an X coordinate is detected. FIG. 8B depicts an electric potential distribution created along the Y direction Y1-Y2 when a Y coordinate is detected.

It is noted that, in the coordinate detecting device 100, as depicted in FIG. 3, the spacer 123 is inserted between the lower substrate 121 and the upper substrate 122, and thereby, the upper substrate 122 is apart from the transparent resistive film 132 formed on the lower substrate 121 with the predetermined space as mentioned above. In the state, when a certain position on the upper substrate 122 is pressed downwardly (in a direction Z2), the upper substrate 122 comes into contact with the transparent resistive film 132 at the certain position.

In step S1-1, the interface board 112 applies a voltage Vx to the first wire 136-1 and the second wire 136-2, and grounds the third wire 136-3 and the fourth wire 136-4. Thus, the voltage Vx is applied to the first and second corners (corresponding to the first and second through holes 151-1 and 151-2) of the common electrode 134, and the third and fourth corners (corresponding to the third and fourth through holes 151-3 and 151-4) of the common electrode 134 are grounded. As a result, an electric potential distribution is created along four sides of the common electrode 134. Then, from the four sides of the common electrode 134 along which the electric potential distribution is thus created, electric potentials are provided to the inside to the transparent resistive film 132 via the respective ones of the electric potential providing parts 141. As a result, an electric potential distribution which is uniform along the direction of X1-X2 as depicted by broken lines in FIG. 8A is created on the transparent resistive film 132. It is noted that, in the related art, an electric potential distribution may be distorted as depicted by dash-dotted lines in FIG. 8A. According to the coordinate detecting device in the embodiment, such distortion is avoided by the function of the resistive film removed part 133 or the electric potential providing parts 141, and precise detection of an X-coordinate can be carried out.

Next, in step S1-2, the interface board 112 detects, via the upper substrate 122 and the fifth wire of the FPC cable 124, an electric potential on the transparent resistive film 132 at the above-mentioned certain position at which the upper substrate 122 comes into contact with the transparent resistive film 132. Then, in step S1-3, the interface board 112 obtains a corresponding X-coordinate based on the thus-detected electric potential on the transparent resistive film 132 formed on the lower substrate 121.

Next, in step S1-4, the interface board 112 applies a voltage Vy to the first wire 136-1 and the fourth wire 136-4, and grounds the second wire 136-2 and the third wire 136-3. Thus, the voltage Vy is applied to the first and fourth corners (corresponding to the first and fourth through holes 151-1 and 151-4) of the common electrode 134, and the second and third corners (corresponding to the second and third through holes 151-2 and 151-3) of the common electrode 134 are grounded. As a result, an electric potential distribution is created along the four sides of the common electrode 134. Then, from the four sides of the common electrode 134 along which the electric potential distribution is thus created, electric potentials are provided to the inside to the transparent resistive film 132 via the respective ones of the electric potential providing parts 141. As a result, an electric potential distribution which is uniform along the direction of Y1-Y2 as depicted by broken lines in FIG. 8B is created on the transparent resistive film 132. It is noted that, in the related art, an electric potential distribution may be distorted as depicted by dash-dotted lines in FIG. 8B. According to the coordinate detecting device in the embodiment, such distortion is avoided by the function of the resistive film removed part 133 or the electric potential providing parts 141, and precise detection of an X-coordinate can be carried out.

Next, in step S1-5, the interface board 112 detects, via the upper substrate 122 and the fifth wire of the FPC cable 124, an electric potential on the transparent resistive film 132 at the above-mentioned certain position at which the upper substrate 122 comes into contact with the transparent resistive film 132. Then, in step S1-6, the interface board 112 obtains a corresponding Y-coordinate based on the thus-detected electric potential on the transparent resistive film 132 formed on the lower substrate 121.

Thus, in the coordinate detecting device according to the embodiment, the first through fourth wires 136-1, 136-2, 136-3 and 136-4 are laminated above the common electrode 134, as depicted in FIGS. 4B, 4C and 4E, and thus, it is possible to reduce the size of the panel part 111. Further, by forming the resistive film removed parts 133, the electric potential distribution created on the transparent resistive film 132 on the lower substrate 121 when an X-coordinate or a Y-coordinate is detected can be made uniform along the direction of X1-X2 or the direction Y1-Y2, as mentioned above with reference to FIGS. 8A and 8B. As a result, it is possible to carry out precise coordinate detection.

(Manufacturing Method)

Next, a manufacturing method carried out by the manufacturing apparatus in the embodiment for manufacturing the coordinate detecting device described above will be described. Specifically, a manufacturing method for manufacturing the above-mentioned lower substrate 121 will be described, with reference to FIGS. 4A, 4B, 4C, 4D and 4E.

First, on the glass substrate 131, the transparent resistive film 132 made of ITO or such is formed in a sputtering method, a vacuum deposition method, or such.

Next, on the transparent resistive film 132, the common electrode 134 made of Ag—C or such is formed. Specifically, a paste including Ag—C or such is used, screen printing is carried out for forming a corresponding pattern, and then, baking is carried out. Thus, the common electrode 134 is formed.

Next, the resistive film removed parts 133 are formed in the transparent resistive film 132. Specifically, with the use of the manufacturing apparatus described with reference to FIG. 1, through the glass substrate 131, laser light is irradiated to corresponding positions on the transparent resistive film 132 at which the transparent resistive film 132 is to be removed. Thus, by ablation, the transparent resistive film 132 is removed at the above-mentioned corresponding positions for the resistive film removed parts 133. At this time, a position of the glass substrate 131 is moved by means of the X-Y table 51, laser light is irradiated by the laser light source 52 based on a signal of the control circuit 54, and thus, the transparent resistive film 132 is removed at the above-mentioned corresponding positions for the resistive film removed parts 133.

As mentioned above with reference to FIG. 1, removal of the corresponding portions of the transparent resistive film 132 to form the resistive film removed parts 133 is carried out based on information of the electric potentials measured by means of the probes 57 and the electric potential measuring unit 58. Specifically, there are two methods. A first method is such that, first, a voltage is applied to the transparent resistive film 132 via the common electrode 134 with the use of the probes 57 and the electric potential measuring unit 58. As a result, electric potentials, thus appearing on the transparent resistive film 132, are measured by means of the probes 57 and the electric potential measuring unit 58. According to the thus-obtained electric potentials, an electric potential distribution created on the transparent resistive film 132 for each of the direction X1-X2 and the direction of Y1-Y2, such as that depicted in FIG. 8A or 8B, can be obtained. Based on the thus-obtained electric potential distribution, an actual configuration of the resistive film removed parts 133 is determined in such a manner that, when distortion is included in the thus-obtained electric potential distribution, the distortion is to be canceled. Then, according to the thus-determined actual configuration of the resistive film removed parts 133, the resistive film removed parts 133 are formed with the use of the laser light source 52 and the X-Y table 51.

A second method is such that, after the above-mentioned first method is carried out, a voltage is again applied to the transparent resistive film 132 via the common electrode 134 with the use of the probes 57 and the electric potential measuring unit 58. Then, electric potentials thus appearing on the transparent resistive film 132 are again measured by means of the probes 57 and the electric potential measuring unit 58, and according to the thus-obtained electric potentials, an electric potential distribution created on the transparent resistive film 132 for each of the direction X1-X2 and the direction of Y1-Y2 can be obtained. Based on the thus-obtained electric potential distribution, the above-mentioned actual configuration of the resistive film removed parts 133 already determined in the first method is modified if distortion still remains in the electric potential distribution, in such a manner that the remaining distortion is to be canceled. Then, according to the thus-modified configuration, the resistive film removed parts 133 already formed in the first method are corrected with the use of the laser light source 52 and the X-Y table 51.

Next, the first insulative film 135 having the first through fourth through holes 151-1, 151-2, 151-3 and 151-4 is formed. Specifically, an insulative paste is used, screen printing is carried out for forming a corresponding pattern, and then, baking is carried out. Thus, the first insulative film 135 is formed.

Next, the first through fourth wires 136-1, 136-2, 136-3 and 136-4 made of Ag or such are formed on the first insulative film 135. Specifically, an electrically conductive paste including Ag is used, screen printing is carried out for forming a corresponding pattern, and then, baking is carried out. Thus, the first through fourth wires 136-1, 136-2, 136-3 and 136-4 are formed.

Next, the second insulative film 137 is formed. Specifically, an insulative paste is used, screen printing is carried out for forming a corresponding pattern, and then, baking is carried out. Thus, the second insulative film 137 is formed.

Thus, the lower substrate 121 is manufactured.

(Control Circuit of Manufacturing Apparatus)

The control circuit 54 depicted in FIG. 54 may include a computer which controls operation of the control circuit 54 such that the control circuit 54 can automatically carry out the above-mentioned first method or the second method to measure electric potentials on the transparent resistive film 132 with the use of the probes 57 and the electric potential measuring unit 58, determine the configuration of the resistive film removed parts 133 and form the resistive film removed parts 133 with the use of the laser light source 52 and the X-Y table 51.

Figure 10:
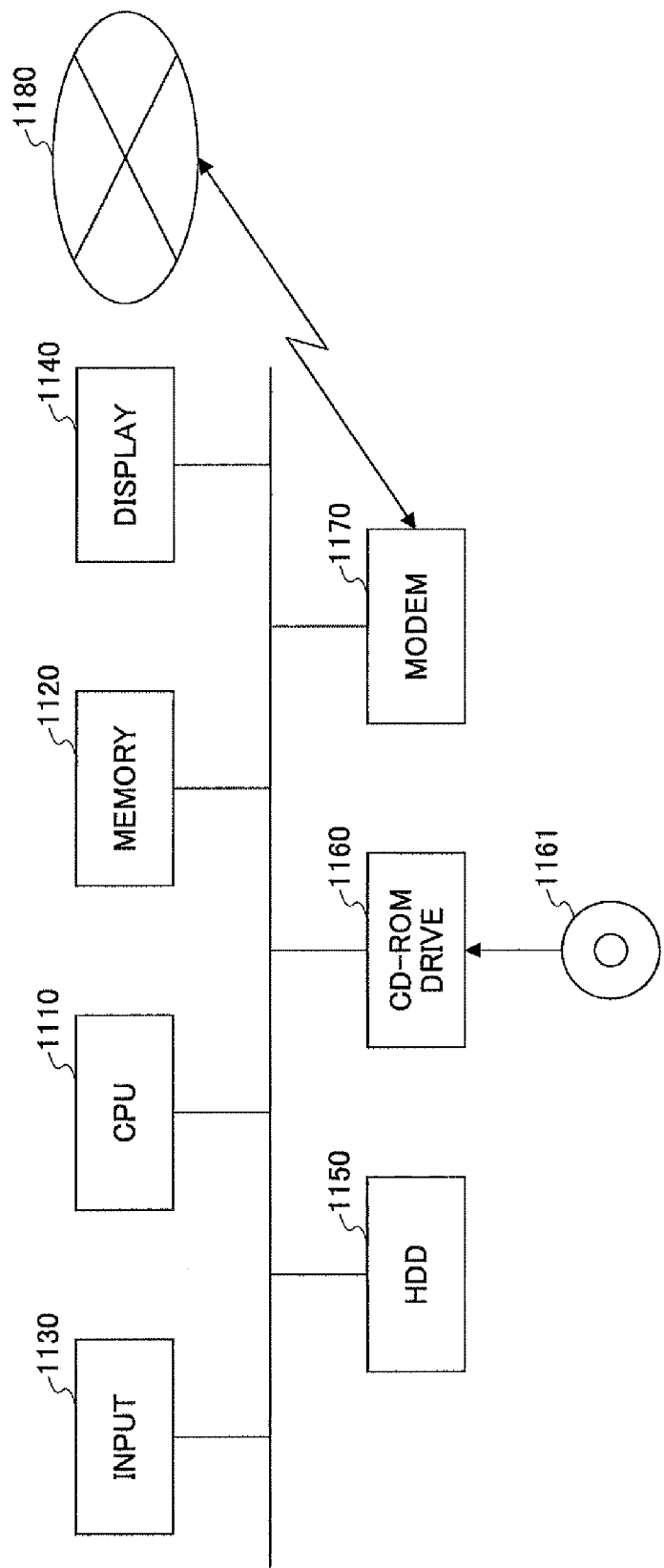
FIG. 10 depicts a block diagram of a computer which a control circuit depicted in FIG. 1 may include.

FIG. 10 depicts a block diagram of a computer applicable as the above-mentioned computer which the control circuit 54 may include. As depicted in FIG. 10, the computer includes a CPU 1110 for carrying out various operations by executing instructions written in the program; an input part 1130 such as a keyboard, a mouse, and so forth, for an operator to input operation contents or data; a display part 1140 such as a CRT, a liquid crystal display device or such, for displaying, to the operator, a processing progress, a processing result or such of the CPU 1110; a memory 1120 such as a ROM, a RAM and so forth, for storing the program to be executed by the CPU 1110, or to be used as a work area of the CPU 1110; a hard disk drive 1150 for storing the program, data and so forth; a CD-ROM drive 1160 for loading the program or data from the outside with the use of a CD-ROM 1161 as an information recording medium; and a modem 1170 for downloading the program or such, from an external server via a communication network 1180 such as the Intent, LAN or such.

The computer depicted in FIG. 10 loads or downloads the program having the instructions for causing the CPU 1110 to carry out the above-mentioned first method or the second method to measure electric potentials on the transparent resistive film 132 with the use of the probes 57 and the electric potential measuring unit 58, to determine the configuration of the resistive film removed parts 133 and to form the resistive film removed parts 133 with the use of the laser light source 52 and the X-Y table 51, according to the instructions written in the program. The CD-ROM 1161 may be used as an information recording medium for loading the program. Also, the communication network 1180 may be used for downloading the program. The program is then installed in the hard disk drive 1150, is loaded on the memory 1120, and is executed by the CPU 1110. As a result, the computer carries out the above-mentioned first method or the second method to measure electric potentials on the transparent resistive film 132 with the use of the probes 57 and the electric potential measuring unit 58, determine the configuration of the resistive film removed parts 133 and form the resistive film removed parts 133 with the use of the laser light source 52 and the X-Y table 51.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that various changes, substitutions, and alterations could be made hereto without departing from the spirit and scope of the invention.

What is claimed is:

1. A manufacturing apparatus of a coordinate detecting device, comprising:
a plurality of probes each provided at a position which comes into contact with a surface of a resistive film that is transparent in a visible region and formed on one surface of a transparent glass substrate of the coordinate detecting device to measure electric potentials of the surface of the resistive film to which a voltage is applied via a common electrode of the coordinate detecting device, wherein said surface of the resistive film faces away from the transparent glass substrate;
a laser light source provided at a position facing the other surface of the transparent glass substrate opposite to said one surface, which irradiates laser light toward the resistive film through the transparent glass substrate to remove a part of the resistive film and form a resistive film removed part based on the electric potentials measured with the plurality of probes;
an optical system which converges the laser light;
an X-Y table which moves the substrate of the coordinate detecting device at least two-dimensionally; and
a control part which controls the X-Y table and the laser light source.

2. The manufacturing apparatus of a coordinate detecting device, as claimed in claim 1, wherein:
the resistive film is made of a material including ITO, or indium oxide, tin oxide or zinc oxide.

3. The manufacturing apparatus of a coordinate detecting device, as claimed in claim 1, wherein:
a wavelength of the laser light falls within a range between 340 nm and 420 nm.

4. The manufacturing apparatus of a coordinate detecting device, as claimed in claim 1, wherein:
the control part is configured to control the X-Y table and the laser light source to form the resistive film removed part at a position along the common electrode to control electric potentials provided to the resistive film via the common electrode to make uniform an electric potential distribution created on the resistive film.

5. A manufacturing apparatus of a coordinate detecting device that includes a transparent glass substrate that has a resistive film formed on one surface thereof, the manufacturing apparatus comprising:
a plurality of probes each provided at a position which comes into contact with a surface of the resistive film formed on said one surface of the transparent glass substrate to measure electric potentials of the surface of the resistive film to which a voltage is applied via a common electrode of the coordinate detecting device, wherein said surface of the resistive film faces away from the transparent glass substrate;
a laser light source provided at a position facing the other surface of the transparent glass substrate opposite to said one surface, which irradiates laser light toward the resistive film through the transparent glass substrate to remove a part of the resistive film from the transparent glass substrate, wherein a wavelength of the laser light falls within a range between 340 nm and 420 nm;
an optical system which converges the laser light toward the resistive film;
an X-Y table which moves the transparent glass substrate in an X-Y plane; and
a control part which controls the X-Y table and the laser light source, wherein the control part controls the laser light source to irradiate the laser light based on the electric potentials measured with the plurality of probes.

6. The manufacturing apparatus of a coordinate detecting device as claimed in claim 5, wherein the resistive film is a transparent resistive film.

7. A manufacturing apparatus that removes a resistive film from a transparent glass substrate, the manufacturing apparatus comprising:
a plurality of probes each provided at a position which comes into contact with a surface of the resistive film formed on one surface of the transparent glass substrate to measure electric potentials of the surface of the resistive film to which a voltage is applied via a common electrode, wherein said surface of the resistive film faces away from the transparent glass substrate;
a laser light source provided at a position facing the other surface of the transparent glass substrate opposite to said one surface, which irradiates laser light toward the resistive film through the transparent glass substrate to remove a part of the resistive film from said one surface of the transparent glass substrate;
an optical system which converges the laser light toward the resistive film; and
a control part which controls the irradiation of the laser light from the laser light source based on the electric potentials measured with the plurality of probes.

8. The manufacturing apparatus as claimed in claim 7, wherein a wavelength of the laser light falls within a range between 340 nm and 420 nm.

9. The manufacturing apparatus of a coordinate detecting device as claimed in claim 1, wherein the plurality of probes is provided in a space formed inside the X-Y table.

* * * * *